United States Patent
Song

(10) Patent No.: US 12,235,804 B2
(45) Date of Patent: Feb. 25, 2025

(54) METHOD AND SYSTEM FOR LOCKING AND SHARING PAGES IN A DOCUMENT

(71) Applicant: SAMSUNG SDS CO., LTD., Seoul (KR)

(72) Inventor: Ji Hun Song, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/200,762

(22) Filed: May 23, 2023

(65) Prior Publication Data

US 2023/0385243 A1 Nov. 30, 2023

(30) Foreign Application Priority Data

May 31, 2022 (KR) .................. 10-2022-0066474

(51) Int. Cl.
*G06F 16/176* (2019.01)
*G06F 40/284* (2020.01)

(52) U.S. Cl.
CPC ........ *G06F 16/1774* (2019.01); *G06F 40/284* (2020.01)

(58) Field of Classification Search
CPC .... G06F 16/1774; G06F 40/284; G06F 16/48; G06F 16/435; G06F 40/205; G06F 40/16; G06F 3/0482; G06F 16/93; G06F 16/951; G06F 16/3329; G06F 40/279; G06F 40/237
USPC ....................................................... 707/704
See application file for complete search history.

(56) References Cited

U.S. PATENT DOCUMENTS

| | | | |
|---|---|---|---|
| 9,998,463 B2 | 6/2018 | Panchapakesan | |
| 11,036,888 B2 | 6/2021 | Huang | |
| 2005/0235163 A1 | 10/2005 | Forlenza et al. | |
| 2011/0047619 A1* | 2/2011 | King ................... | G06F 21/6218 707/E17.014 |
| 2012/0227089 A1* | 9/2012 | Lee ........................ | H04L 63/10 726/4 |

(Continued)

FOREIGN PATENT DOCUMENTS

| KR | 10-1389459 B1 | 4/2014 |
|---|---|---|
| KR | 10-2015-0027567 A | 3/2015 |

(Continued)

OTHER PUBLICATIONS

Communication dated Mar. 5, 2024, issued by the European Patent Office in counterpart European Application No. 23175090.2.

(Continued)

Primary Examiner — Evan Aspinwall
(74) Attorney, Agent, or Firm — Sughrue Mion, PLLC

(57) ABSTRACT

Provided is a method performed by at least one processor for sharing a page in a document. The method includes: receiving a request for sharing a page of a document and automatically performing a keyword check for the requested page; generating a token for a keyword, extracted from the requested page as a result of the keyword check, and performing a locking process for the requested page using the token; and determining a target page, among at least one requested page for sharing, and designating a sharing target with which the target page is to be shared, wherein the keyword is any one of one or more words registered in advance.

14 Claims, 12 Drawing Sheets

(56) References Cited

U.S. PATENT DOCUMENTS

| | | | | |
|---|---|---|---|---|
| 2014/0317225 | A1* | 10/2014 | McEntee | G06F 16/1873 |
| | | | | 709/216 |
| 2016/0070812 | A1* | 3/2016 | Murphy | G06F 21/6218 |
| | | | | 707/608 |
| 2018/0196953 | A1* | 7/2018 | More | H04L 63/10 |
| 2019/0138182 | A1* | 5/2019 | Kropivny | A63F 13/00 |
| 2019/0268379 | A1* | 8/2019 | Narayanaswamy | G06F 16/951 |
| 2019/0354715 | A1* | 11/2019 | Allen | G06F 21/6245 |
| 2020/0380167 | A1* | 12/2020 | Chen | G06F 21/6254 |
| 2021/0194888 | A1* | 6/2021 | Bhaskar S | G06F 16/3347 |
| 2021/0365589 | A1* | 11/2021 | Qiao | G06F 21/84 |

FOREIGN PATENT DOCUMENTS

| | | |
|---|---|---|
| KR | 10-2015-0052945 A | 5/2015 |
| KR | 10-2017-0052088 A | 5/2017 |
| KR | 10-2227525 B1 | 3/2021 |

OTHER PUBLICATIONS

Anonymous, "Password protect individual pages in a pdf," Apr. 21, 2022 (date of the most-recent contribution on the page), total 3 pages, XP093135448, retrieved from: https://community.adobe.com/t5/acrobat-discussions/password-protect-individual-pages-in-a-pdf/td-p/11891488.

Anonymous, "Sipgate enables fax to be sent directly from Windows", May 8, 2007, pp. 1-3, XP093083909, Retrieved from the Internet: URL:https://www.pressebox.de/pressemitteilung/sipgate-gmbh/sipgate-ermoeglicht-Fax-Versand-direkt-aus-Windows-heraus/boxid/105159.

Extended Search Report issued Oct. 9, 2023 issued by the European Patent Office for EP Patent Application No. 23175090.2.

* cited by examiner

METHOD AND SYSTEM FOR LOCKING AND SHARING PAGES IN A DOCUMENT

CROSS-REFERENCE TO RELATED APPLICATION

This application claims the benefit of Korean Patent Application No. 10-2022-0066474, filed on May 31, 2022, in the Korean Intellectual Property Office, the disclosure of which is incorporated herein by reference in its entirety.

BACKGROUND

1. Field

The present disclosure relates to a method and system for locking and sharing a document by each page. More specifically, the present invention relates to a method and system for locking a document stored in a document sharing system by each page and sharing the document by each page.

2. Description of the Related Art

The enterprise document centralization system (Enterprise File Sync & Share) aims to block the circulation of documents containing important information and confidential matters, and to manage important enterprise documents.

If a document is created and then uploaded to the enterprise document centralized system for sharing, important information that should not be shared may be shared and core information may be exposed against the intention of the document creator (document owner).

Therefore, when a document owner shares a document containing important information, in order to avoid the above security issues, there are inconveniences in that the document owner needs to remove the important information and create a new document consisting of pages without important information, and share the new document.

Therefore, there is a need for a method of automatically determining whether or not important information is included in a document and locking the document. Furthermore, there is a need for a method for enabling a document owner to share a document by each page without creating a new document excluding pages including important information.

SUMMARY

A technical problem to be solved by the present disclosure is to provide a method for sharing a document by each page.

Another technical problem to be solved by the present disclosure is to provide a method and system for sharing a document by each page and automatically locking the document by each page.

Another technical problem to be solved by the present disclosure is to provide a document centralization system that automatically checks and locks important information included in a document.

The technical problems of the present disclosure are not limited to the above-mentioned technical problems, and other technical problems not mentioned will be clearly understood by those skilled in the art from the description below.

According to an aspect of an example embodiment, there is provided a method performed by at least one processor for sharing a page in a document, the method including: receiving a request for sharing a page of a document and automatically performing a keyword check for the requested page; generating a token for a keyword, extracted from the requested page as a result of the keyword check, and performing a locking process for the requested page using the token; and determining a target page, among at least one requested page for sharing, and designating a sharing target with which the target page is to be shared, wherein the keyword is any one of one or more words registered in advance.

The method may further include, prior to receiving the request for sharing the page of the document and automatically performing the keyword check on the requested page: receiving a request for sharing the document; and providing a page list of the document.

The automatically performing the keyword check for the requested page may include: determining whether a number of keywords included in the requested page is equal to or greater than a reference value; and adding, based on the number of keywords included in the requested page being equal to or greater than the reference value, a warning indication to the requested page containing the keywords of which number is equal to or greater than the reference value.

The performing the locking process for the requested page may include: determining a lock processing method according to an attribute of the keyword.

The lock processing method may include a method of hiding the requested page based on a first keyword being included in the requested page.

The lock processing method may include a method of indicating an entire requested page as locked based on a second keyword being included in the requested page.

The lock processing method may include a method of indicating only a region of the requested page, in which a third keyword is included, as locked, based on the third keyword being included in the requested page.

The performing the locking process may include: indicating only a region of the requested page, in which a third keyword is included, as locked, based on the third keyword being included in the requested page.

The performing the locking process may include: indicating an entire requested page as locked.

The performing the locking process may include hiding the requested page.

The determining the target page and the designating the sharing target may include: receiving a request for sharing the target page, wherein the target page is determined by a user; mapping a first token, which is generated with respect to a keyword included in the target page, to the sharing target and registering the first token as a sharing target token for the sharing target; and transmitting data for viewing the target page to a terminal of the sharing target with reference to the sharing target token.

The transmitting the data for viewing the target page may include: receiving, from the sharing target, a request for the target page; determining whether the target page is locked; determining, based on the target page being locked, whether a sharing target token corresponding to the locked target page is registered for the sharing target; and unlocking, based on the sharing target token being registered, a keyword-locked target page by using the registered sharing target token and allowing viewing of the target page by the sharing target.

According to an aspect of an example embodiment, there is provided an apparatus for sharing a page in a document, the apparatus including: at least one processor; and at least one memory configured to store computer program executable by the at least one processor, wherein the computer program includes: an instruction configured to cause the at least one processor to receive a request for sharing a page of a document and automatically performing a keyword check for the requested page; an instruction configured to cause the at least one processor to generate a token for a keyword, extracted from the requested page as a result of the keyword check, and performing a locking process for the requested page using the token; and an instruction configured to cause the at least one processor to a share a target page, among at least one requested page for sharing, and designating a sharing target with which the target page is to be shared, wherein the keyword is any one of one or more words registered in advance.

The computer program may further include: an instruction configured to cause the at least one processor to receive a request for sharing the document; and an instruction configured to cause the at least one processor to provide a page list of the document.

According to an aspect of an example embodiment, there is provided a non-transitory computer-readable recording medium storing computer program, the computer program being executable by at least one processor to cause the at least one processor to perform: receiving a request for sharing a page of a document and automatically performing a keyword check for the requested page, wherein the keyword check is performed with respect to a keyword that is any one of one or more words registered in advance; generating a token for a keyword, extracted from the requested page as a result of the keyword check, and performing a locking process for the requested page using the token; and determining a target page, among at least one requested page for sharing, and designating a sharing target with which the target page is to be shared.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In describing the present disclosure, when it is determined that the detailed description of the related well-known configuration or function may obscure the gist of the present disclosure, the detailed description thereof will be omitted.

Figure 1:
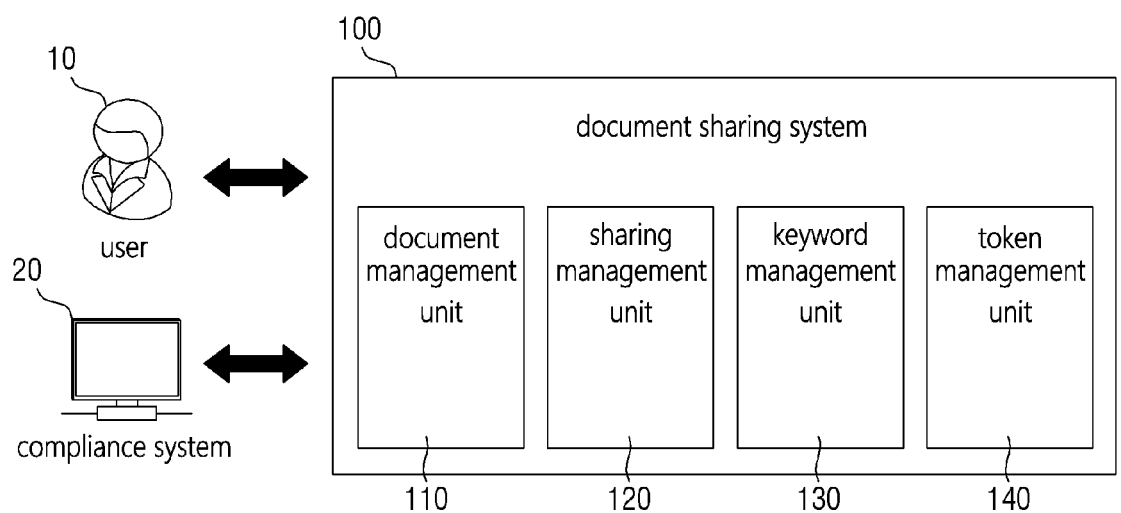
FIG. 1 is a configuration diagram of a document sharing system according to an embodiment of the present disclosure.

Hereinafter, embodiments of the present disclosure will be described with reference to the attached drawings:

FIG. 1 is a configuration diagram of a document sharing system 100 according to an embodiment of the present disclosure.

Referring to FIG. 1, the document sharing system 100 according to this embodiment may include a document management server 110, a sharing management server 120, a keyword management server 130, and a token management server 140.

The document management unit 110 may receive a document sharing request from the user 10 and provide a page list of the document. Here, the user 10 is a document sharing requester, and may be a document creator or a document owner.

According to one embodiment, the document may be an electronic document in a PDF file format. If the document is not in a PDF file format, it may be converted into a PDF file format by a PDF converter included in a backend system (not shown) of the document sharing system 100.

According to an embodiment, the document management unit 110 may receive a sharing request for a sharing request page from the user 10. Here, the sharing request page refers to a page that is selected and requested to be shared by the user 10 from the page list of the document provided by the document management unit 110. In this case, the sharing request page may be a plurality of pages.

The sharing management unit 120 may receive a sharing target page and a request for designating a sharing target from the user 10. Here, the sharing target page may refer to a page determined as a page to be shared among sharing request pages by a document sharing requester. In addition, the user 10 may be a sharing requester who requests to designate a sharing target page and a sharing target. Alternatively, the user 10 may be another user designated as a document sharing target by a document sharing requester, to whom the document is to be shared.

According to an embodiment, the sharing management unit 120 may register a token corresponding to the sharing target page generated by the token management unit 140 and may store the sharing target page. In addition, a sharing target token registration result for a sharing target may be provided to the document sharing requester.

The keyword management unit 130 may receive a keyword check request for the sharing request page of the document management unit 110, perform keyword check of the sharing request page, and transmit the keyword check result to the document management unit 110. Here, various conventional keyword extraction algorithms may be used as the keyword checking method.

According to one embodiment, the keyword may be any one of one or more words registered in advance.

According to one embodiment, the keyword may be any one of one or more words stored and managed in a file indexing format in a database of a backend system (not shown) of the document sharing system 100.

According to an embodiment, the keyword may be one or more words including important company information included in the document, such as compliance information, key technical terms, or confidential information included in the document.

The token management unit 140 may generate a token corresponding to the keyword by receiving a token generation request from the keyword management unit 130 when a keyword is extracted as a result of the keyword check for the sharing request page of the keyword management unit 130.

According to one embodiment, the token may be an authentication token generated by the token management server 140 and stored in the token management server 140.

For example, the token may be an authentication token for granting access permission to a website or application based on an open standard protocol for authentication such as Open Authorization.

According to an embodiment, the sharing request page may be locked by the document management unit 110 according to a lock processing method based on attributes of keywords using the token generated by the token management unit 140.

According to an embodiment, the lock processing method according to the attribute of the keyword may be any one of a method of hiding the sharing request page when the first keyword is included in the sharing request page, a method of displaying the entire sharing request page as locked when the second keyword is included in the sharing request page, and a method of displaying only a region as locked where the third keyword of the sharing request page is displayed when the third keyword is included in the sharing request page.

Here, the attributes of the keywords may be attributes classified according to importance of main technical information or compliance information. For example, if the first keyword, which has the highest importance among the key technical information keyword data stored in the database of the document sharing system 100, is included in the sharing request page, the sharing request page may be hidden, and if the third keyword, which has the lowest important, is included in the sharing request page, only a region may be displayed as locked where the third keyword of the sharing request page is displayed.

According to one embodiment, attributes of keywords may be attributes classified according to a predefined grouping method of keyword data.

According to the above-described embodiments, a document may be shared by each page unit of the document, and security issues regarding a document may be prevented in advance through keyword extraction of company internal key information and compliance information.

In addition, according to the above-described embodiments, an effect of improving storage management of unnecessary edited documents is provided through the permission management of a document by page unit without generating additional documents.

In addition, according to the above-described embodiments, an effect of automatically locking a document by the system according to importance is provided. In addition, by changing the lock processing method of the sharing request page according to the attribute of the keyword, the user may easily identify the importance of the contents included in the document to be shared.

According to an embodiment, when a plurality of keywords are included in the sharing request page, a lock processing method may be determined according to a predefined priority order. An embodiment of a lock processing method according to priority will be described later with reference to FIG. 7.

According to an embodiment, the compliance system 20 requests the keyword management unit 130 to check keywords for documents stored in the document management unit 110 of the document sharing system 100, and automatically locks the document. In this case, documents stored in the document sharing system 100 are automatically locked by the compliance system 20, thereby providing an effect of increasing the security level of the document sharing system 100.

The document sharing system 100 described above may be implemented with one or more computing devices having a processor. For example, each component such as the document management unit 110 may be implemented as one computing device, or a plurality of components or the document sharing system 100 may be implemented as one computing device. A computing device may refer to any device having a computing function, and an example of such a device may be referred to FIG. 12.

Next, a method of sharing a document by each page according to another embodiment of the present disclosure will be described with reference to FIGS. 2 to 9. The method of sharing a document by each page according to the present embodiment may be performed by one or more computing devices. For example, in the document sharing method by each page according to the present embodiment, all operations may be performed by one computing device, or some operations may be performed by another computing device. Hereinafter, it will be described on the assumption that the method described below is performed by the document sharing system 100 illustrated in FIG. 1. Therefore, in the following description, if the description of the subject of performing some operations is omitted, it would be understood that they are performed by the document sharing system 100.

Figure 2:
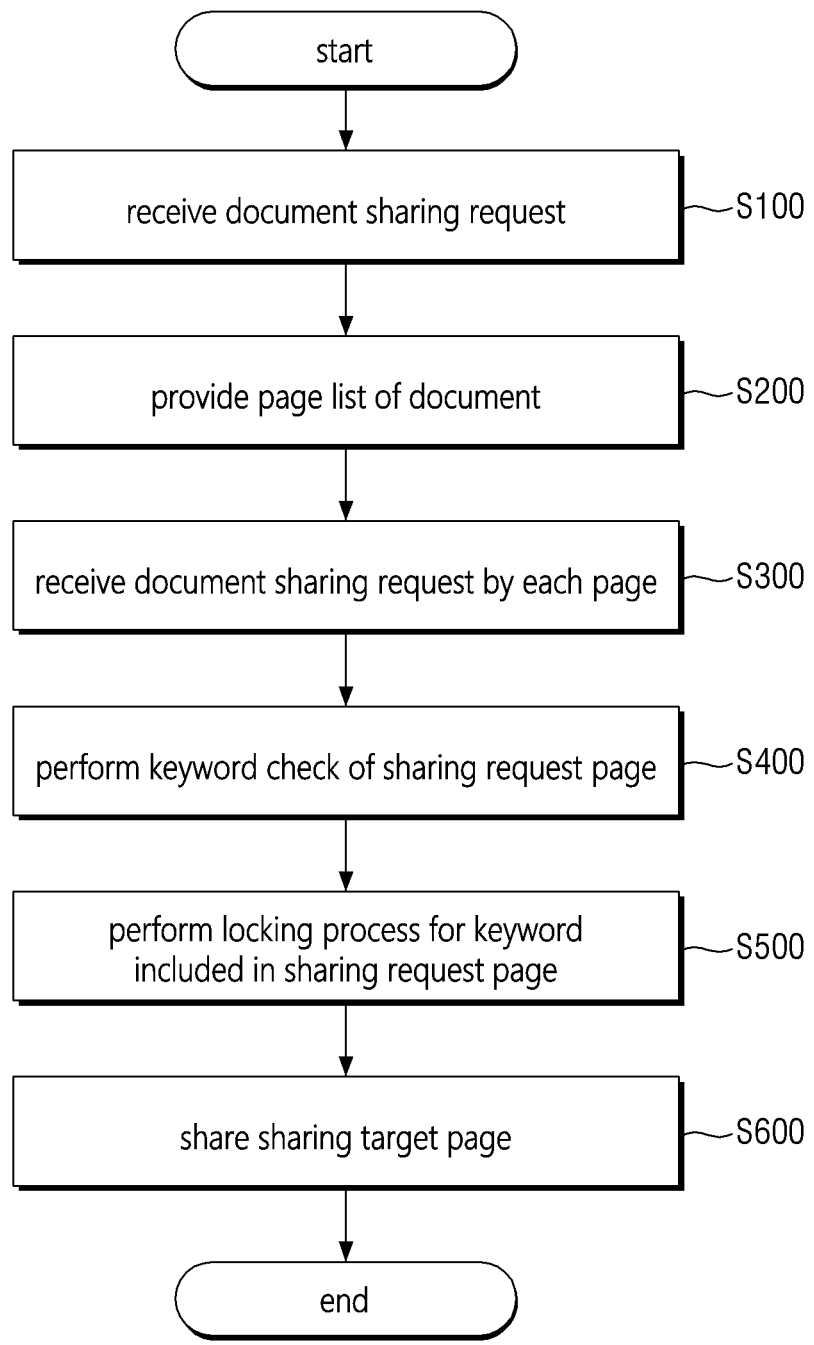
FIG. 2 is a flowchart of a method for sharing a document by each page according to another embodiment of the present disclosure.

FIG. 2 is a flowchart of a method of sharing a document by each page according to another embodiment of the present disclosure.

In step S100, a document sharing request of the document sharing requester is received by the document sharing system 100. In this case, the document may be a document stored in the document sharing system 100 or a document uploaded by a document sharing requester.

In step S200, the document sharing system 100 may receive a document sharing request from a document sharing requestor (S100) and provide a page list of a document requested for sharing to the document sharing requester.

In step S300, a sharing request for a sharing request page may be received. Here, the sharing request page may be a page requested for sharing by the document sharing requester selecting a page to request sharing from a page list of a sharing requested document provided to the document sharing requester.

In step S400, a sharing request for a sharing request page of a document is received (S300), and the keyword check for the sharing request page may be automatically performed. Here, the keyword may be any one of one or more words registered in advance.

Figure 3:
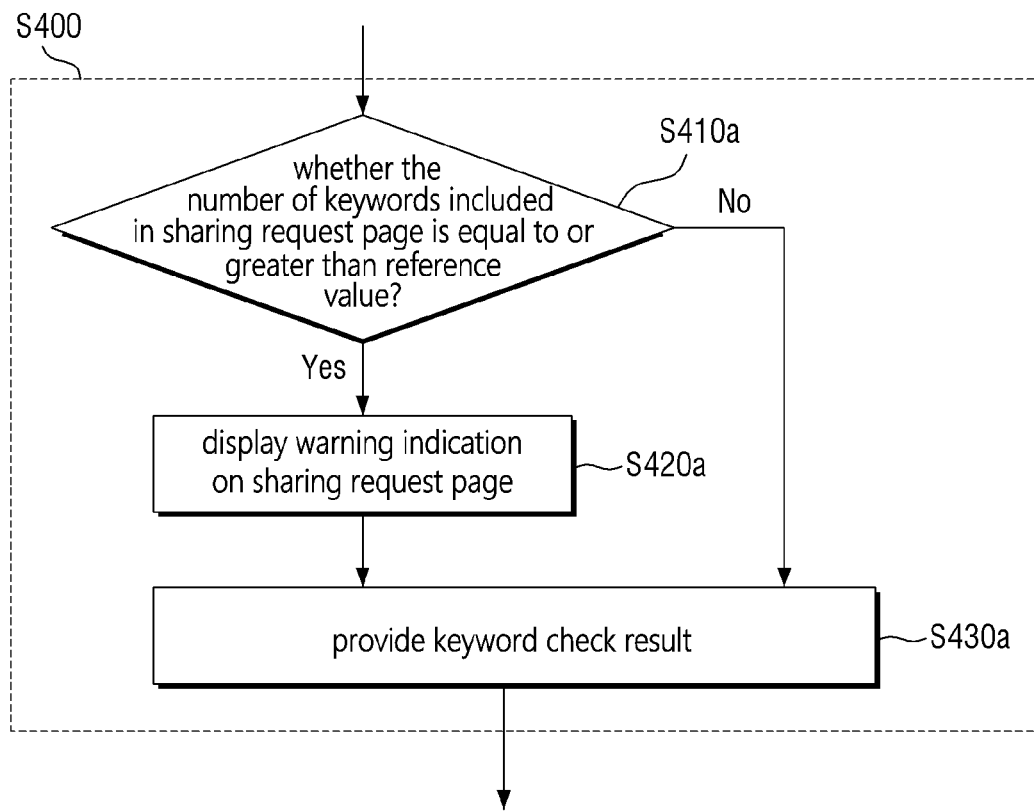
FIG. 3 is a detailed flowchart illustrating an embodiment of a method for checking a keyword of a sharing request page described with reference to FIG. 2.

FIG. 3 is a detailed flowchart illustrating an embodiment of a method for checking a keyword of a sharing request page described with reference to FIG. 2. Referring to FIG. 3, it is determined whether the number of keywords in the sharing request page is equal to or greater than a reference value (S410a). If the number of keywords is less than the reference value, the keyword check result for the sharing request page is provided without any other indication (S430a). If the number of keywords included in the sharing request page is equal to or greater than the reference value, a warning indication may be added to the sharing request page (S420a), and keyword check results may be provided (S430a).

Here, the keyword check result may be the number of keywords included in the sharing request page, the number of keywords grouped and distinguished based on the attribute of the keyword, or a sharing request page and a list of sharing request pages, for which a warning indication is displayed on the sharing request page.

According to the above-described embodiment, when the sharing request page includes keywords equal to or greater than the reference value, it is treated as a document of high importance, and thus, an effect, in which a sharing requestor may easily identify it and finally determine whether to share the document, is provided.

Referring back to FIG. 2, in step S500, a token may be generated for the keyword extracted from the sharing request page according to the keyword check result, and the locking process may be performed on the sharing request page using the generated token.

According to an embodiment, the document sharing system 100 may store a token generated for a keyword extracted from the sharing request page in the document sharing system 100.

Referring to FIGS. 4 to 7, various embodiments of a lock processing method based on keyword attributes included in the sharing request page in step S500 of FIG. 2 will be described.

Figure 4:
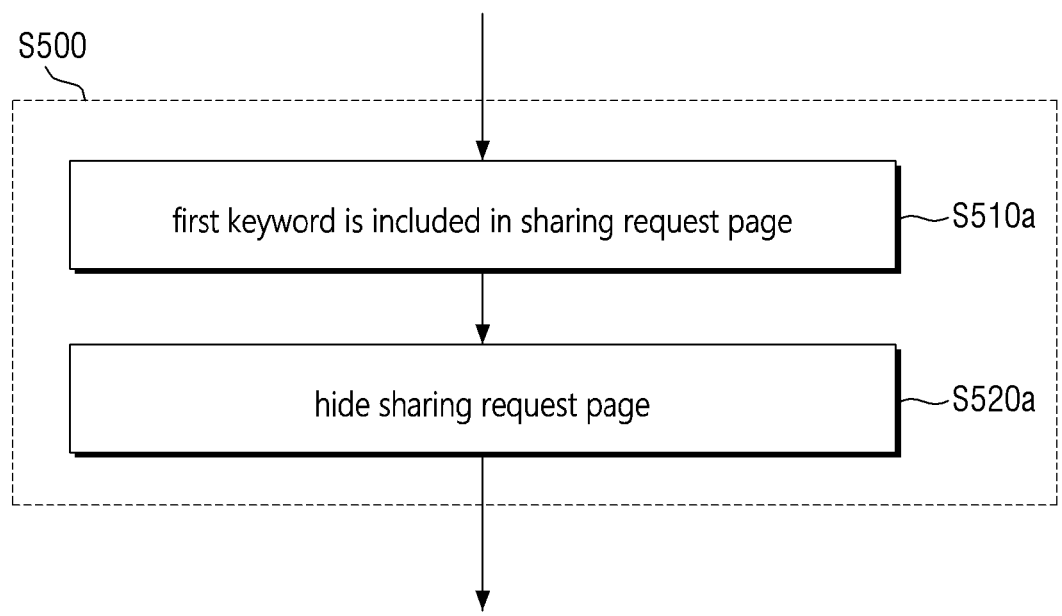
FIGS. 4 to 7 are detailed flowcharts for describing embodiments of a keyword lock processing method included in a sharing request page described with reference to FIG. 2.

FIG. 4 is a flowchart illustrating a keyword lock processing method according to an embodiment of the present disclosure. Referring to FIG. 4, when a keyword check is performed on the sharing request page (S400) and the first keyword is included in the sharing request page as a result of the keyword check (S510a), a first token for the first keyword is generated, and the sharing request page may be hidden using the first token (S520a). In this case, the entire sharing request page within the document is hidden and invisible.

According to an embodiment, a keyword check result, and a keyword-locked sharing request page, and a list of keyword-locked sharing request pages may be provided to a sharing requester. In this case, the sharing requester may refer to the provided keyword check result and the list of locked sharing requested pages, etc., and finally determine the sharing target page later.

Figure 5:
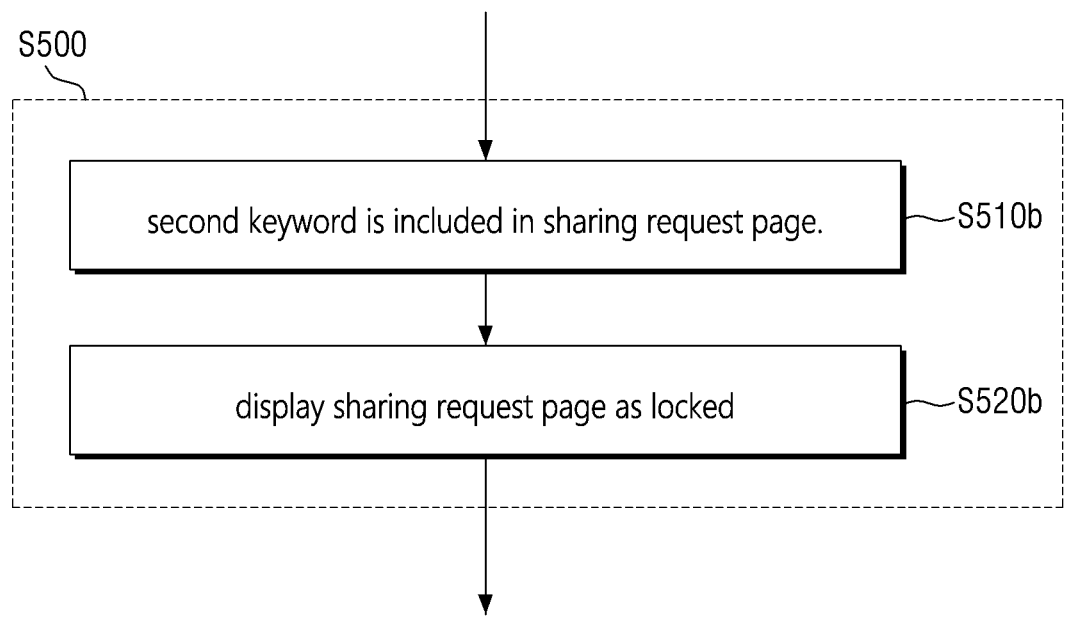

FIG. 5 is a flowchart illustrating a keyword lock processing method according to an embodiment of the present disclosure. Referring to FIG. 5, when a keyword check is performed on the sharing request page (S400), and the second keyword is included in the sharing request page as a result of the keyword check (S510b), a second token for the second keyword is generated. And, the sharing request page may be displayed as locked using the second token (S520b). In this case, the entire sharing request page within the document is displayed as locked.

Figure 6:
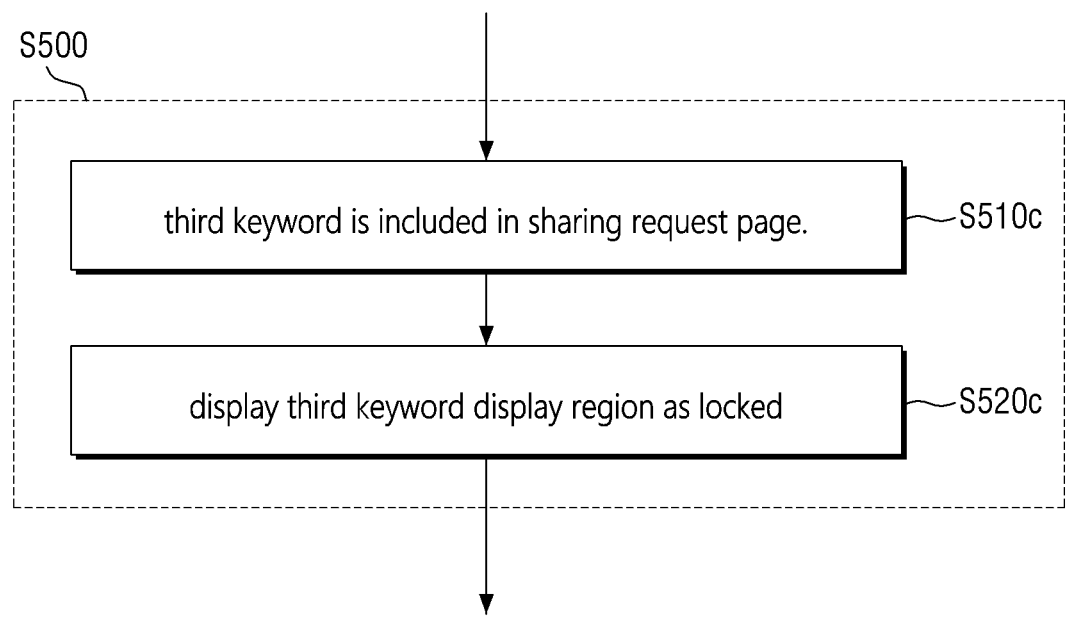

FIG. 6 is a flowchart illustrating a keyword lock processing method according to an embodiment of the present disclosure. Referring to FIG. 6, a keyword check is performed on the sharing request page (S400), and if the third keyword is included in the sharing request page as a result of the keyword check (S510c), a third token for the third keyword is generated, the third keyword display region of the sharing request page may be displayed as locked using the third token (S520c). In this case, the rest of the region except for the third keyword display region of the corresponding sharing request page is displayed as opened to public.

According to the above-described embodiments, when sharing of a page of a document is requested, an effect of automatically locking a sharing request page including a keyword is provided. In addition, by changing the lock processing method of the sharing request page according to the attribute of the keyword, the user may easily identify the importance of the contents included in the document to be shared.

Figure 7:
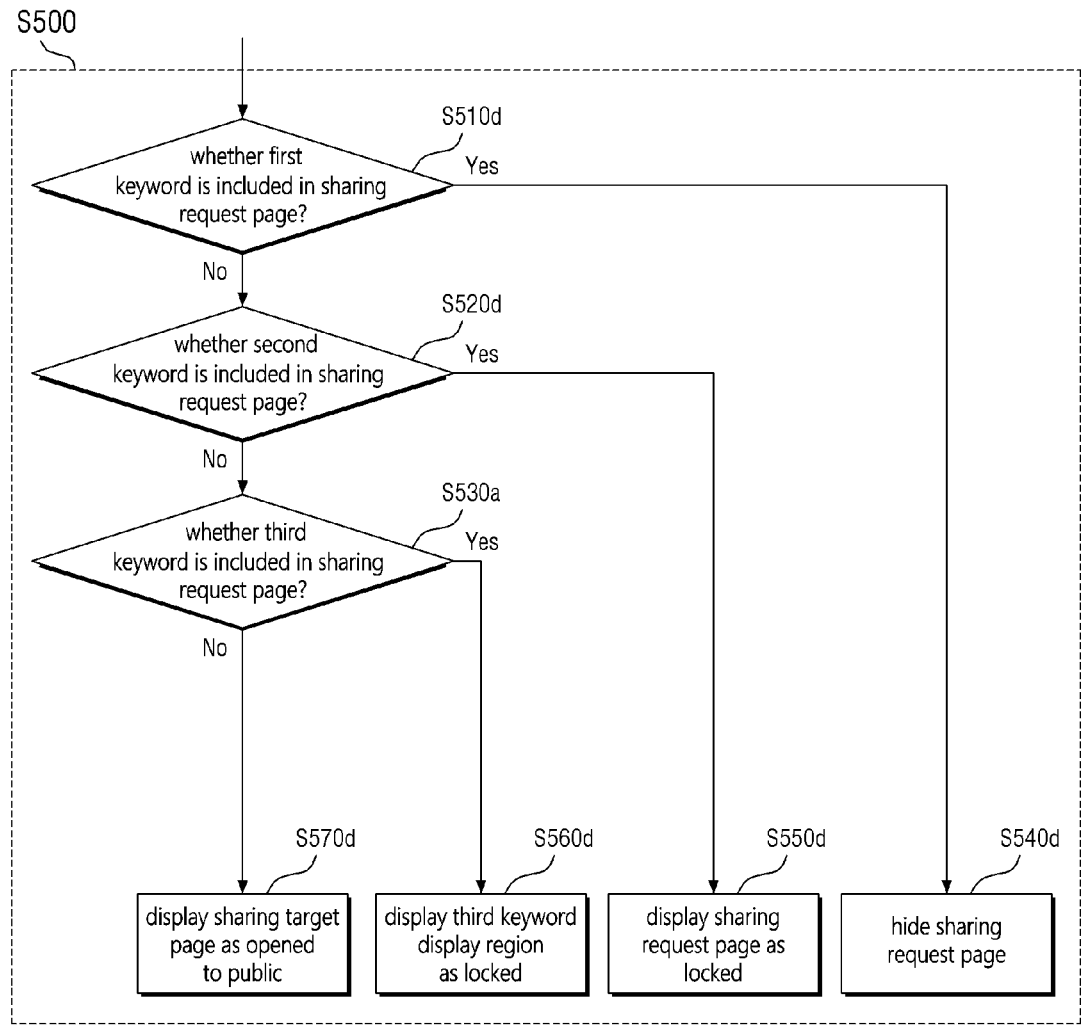

FIG. 7 is a flowchart illustrating a keyword lock processing method when a plurality of keywords exist in a sharing request page according to an embodiment of the present disclosure of FIG. 2. Referring to FIG. 7, it is determined whether the first keyword is included in the sharing request page (S510d). If the first keyword is included, the sharing request page may be hidden (S540d). If the first keyword is not included in the sharing request page, it is determined whether the second keyword is included in the sharing request page (S520d). If the second keyword is included, the sharing request page is displayed as locked (S550d). If the second keyword is not included, it is determined whether the third keyword is included in the sharing request page (S530d). If the third keyword is included, only the third keyword display region of the sharing request page is displayed as locked (S560d). If the third keyword is not included, the entire sharing request page is displayed as opened to public (S570d).

Here, the first to third keywords may be words determined according to a grouping method of keyword data registered in advance based on keyword attributes. For example, the first keyword may be information of high importance, the second keyword may be information of medium importance, and the third keyword may be information of low importance. In this case, according to the priority order, the sharing request page including the first keyword is hidden regardless of whether the second keyword and the third keyword are included.

According to the above-described embodiment, when there are a plurality of keywords in a sharing request page, an effect of automatically determining a lock processing method according to a predetermined priority based on attributes of the keywords is provided.

Referring back to FIG. 2, in step S600, the sharing target page is shared with the sharing target.

Hereinafter, with reference to FIGS. 8 and 9, an embodiment of a method for sharing a sharing target page with a sharing target in step S600 of FIG. 2 will be described.

Figure 8:
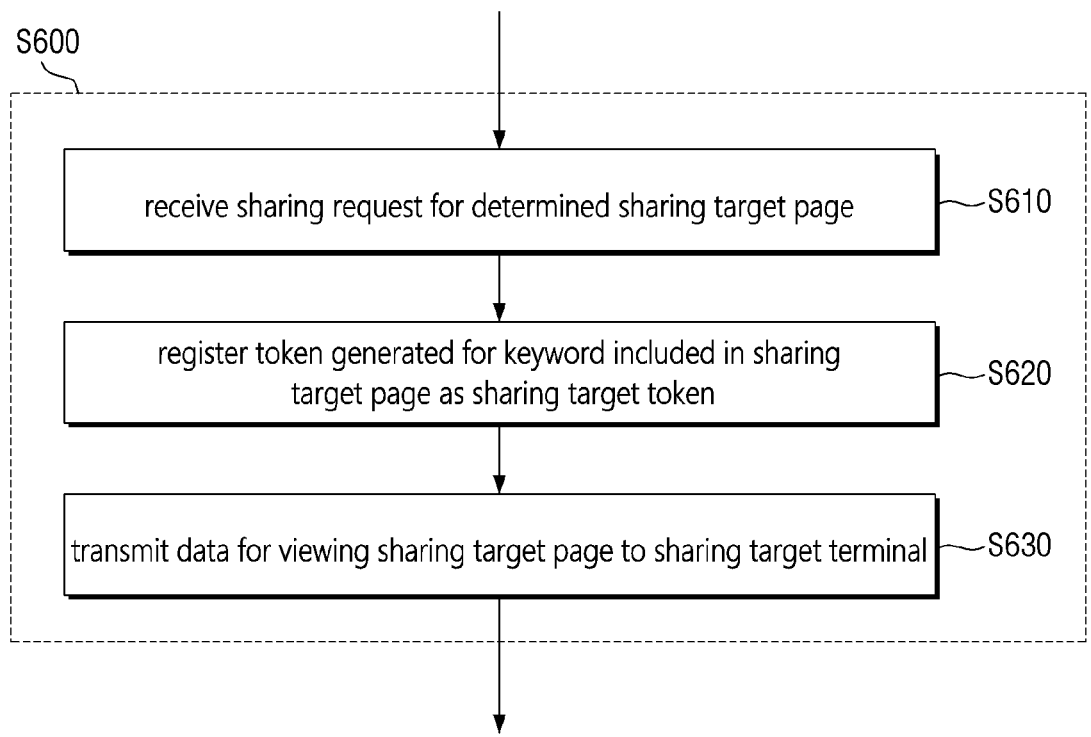
FIG. 8 is a detailed flowchart illustrating a method for sharing the sharing target page described with reference to FIG. 2.

FIG. 8 is a flowchart illustrating a method for sharing a sharing target page according to an embodiment of the present disclosure. Referring to FIG. 8, a sharing requester determines a sharing target page among sharing request pages based on a keyword check result and a list of locked sharing request pages, and the document sharing system 100 may receive the sharing request of the determined sharing target page from the document sharing requester (S610).

According to an embodiment, the document sharing requester may designate a sharing target for each sharing target page and request the document sharing system 100 for a sharing target page for each sharing target.

According to the above-described embodiment, a document sharing requester designates a sharing target and shares for each target page, thereby simplifying a work process and sharing some pages of a document without additional document editing.

The document sharing system 100 may receive a sharing request for a sharing target page from a document sharing requester and register a token generated for a keyword included in the sharing target page as a sharing target token (S620). In this case, the tokens generated for keywords included in the sharing target page are tokens generated for keywords extracted as a result of keyword check on the sharing request page, and it may be some of the tokens stored in the document sharing system 100.

According to an embodiment, the sharing target token may be a token registered as a sharing target token for a sharing target by mapping a token generated with respect to a keyword included in the determined sharing target page to each designated sharing target.

After that, the document sharing system 100 may refer to the sharing target token and transmit data for viewing the sharing target page to the terminal of the sharing target (S630). Here, the data for viewing the sharing target page may be, for example, PDF format data.

Figure 9:
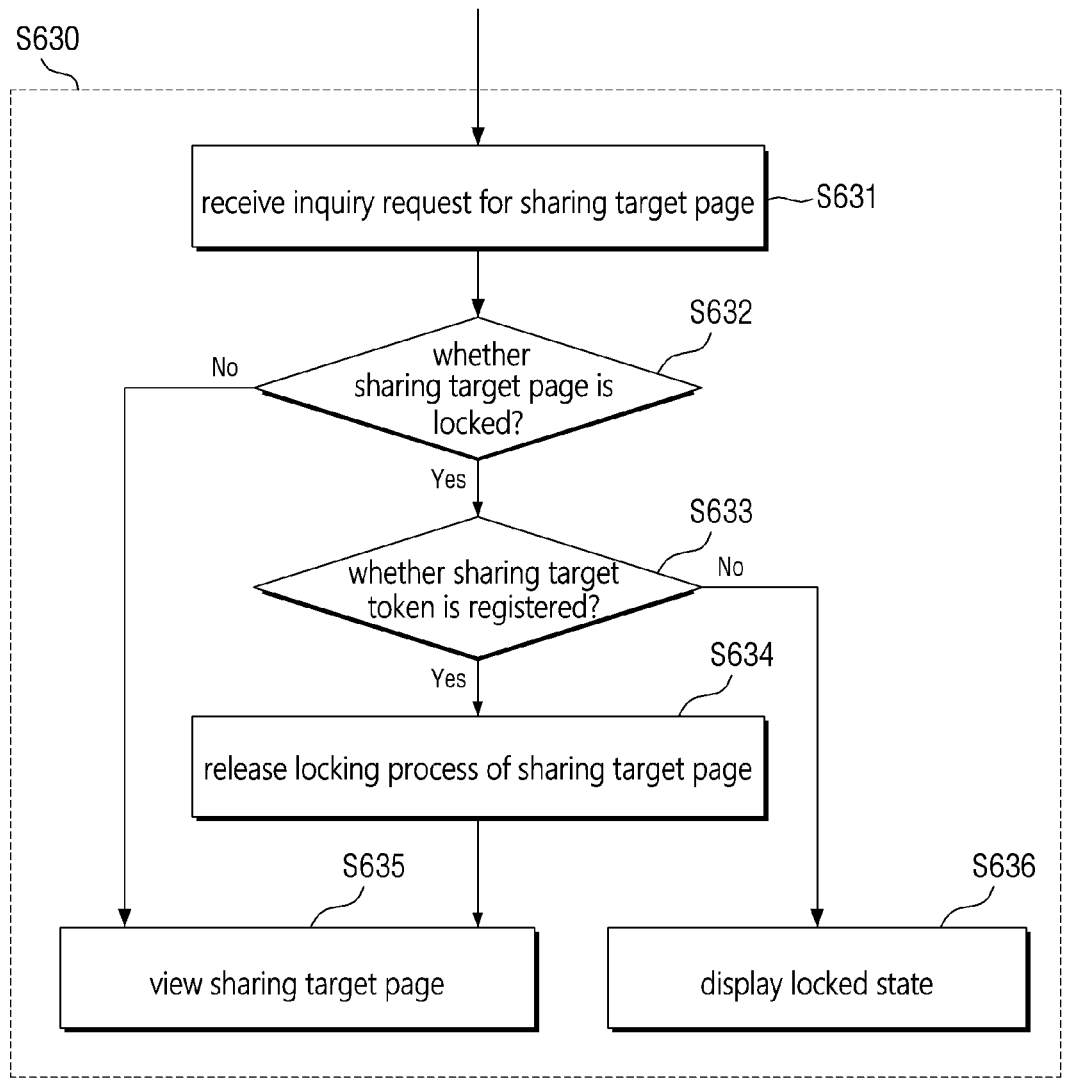
FIG. 9 is a detailed flowchart for describing in detail the operation of the method for transmitting data for viewing a sharing target page to a terminal of a sharing target described with reference to FIG. 8.

FIG. 9 is a flowchart illustrating in detail the operation of the method for transmitting data for viewing a sharing target page to a terminal of a sharing target described with reference to FIG. 8.

Referring to FIG. 9, first, an inquiry request for a sharing target page is received from a sharing target (S631). At this time, it is determined whether the locking process is performed on the sharing target page, which is requested to inquiry by the sharing target (S632). If the locking process is not performed, the sharing target may view the sharing target page (S635). If the locking process is performed, it is determined whether a sharing target token for the corresponding sharing target page is registered with the sharing target (S633). If the sharing target token is not registered, the document sharing system 100 may display the corresponding sharing target page in a locked state to the sharing target (S636). When the sharing target token is registered, the locking process of the sharing target page is released (S634), and the sharing target may view the sharing target page (S635).

For example, if a sharing target page is locked only in the keyword region, and if a sharing target token is not registered with the sharing target, the sharing target may view the contents of the sharing target page except for the keyword region.

For example, if the sharing target page is in a hidden state and the sharing target token is not registered with the sharing target, the sharing target page may be displayed in a locked state to the sharing target.

Figure 10:
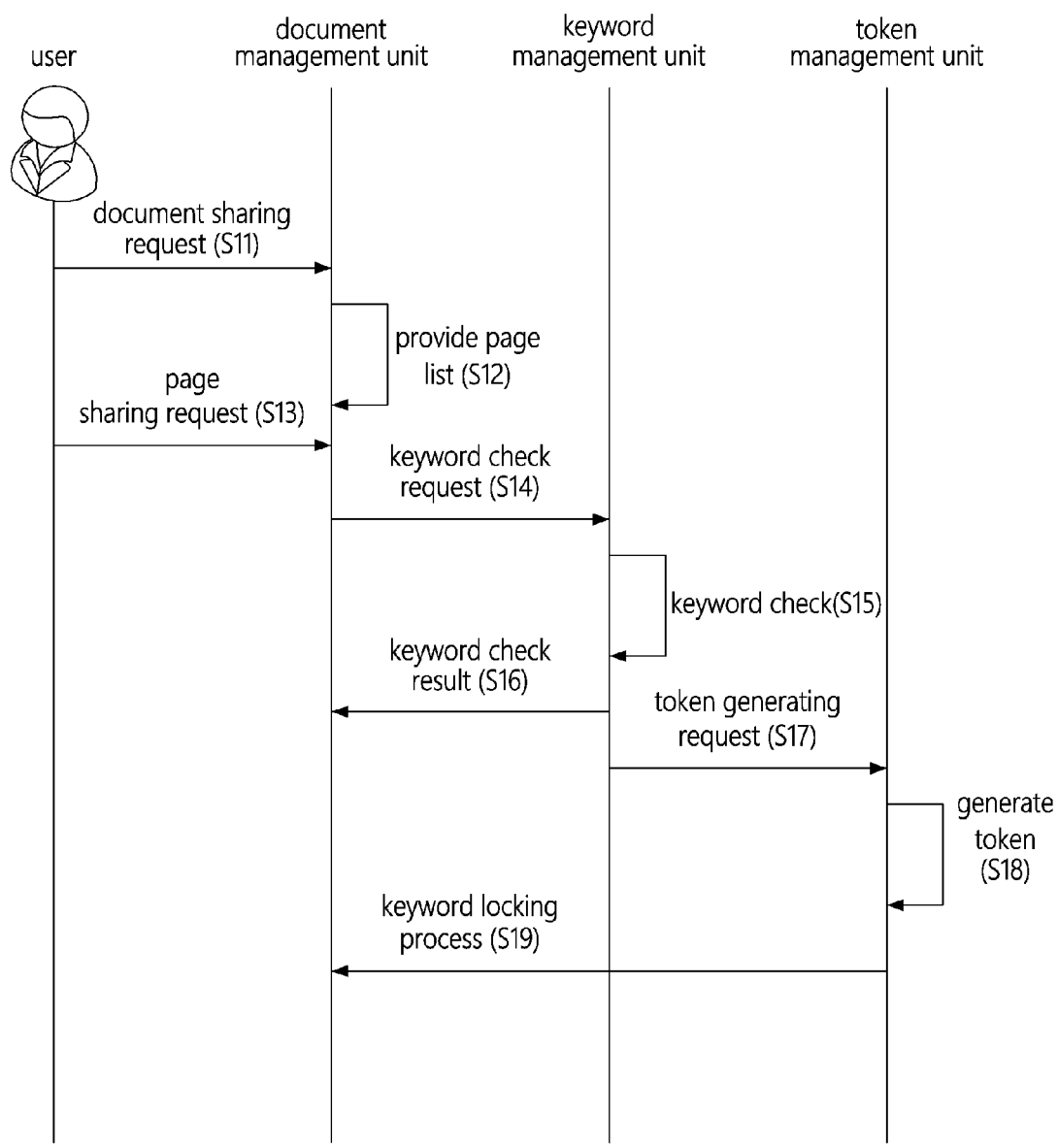
FIGS. 10 and 11 are signal flow diagrams for describing a method for sharing a document by each page according to an embodiment of the present disclosure operating in the document sharing system described with reference to FIG. 1.
Figure 11:
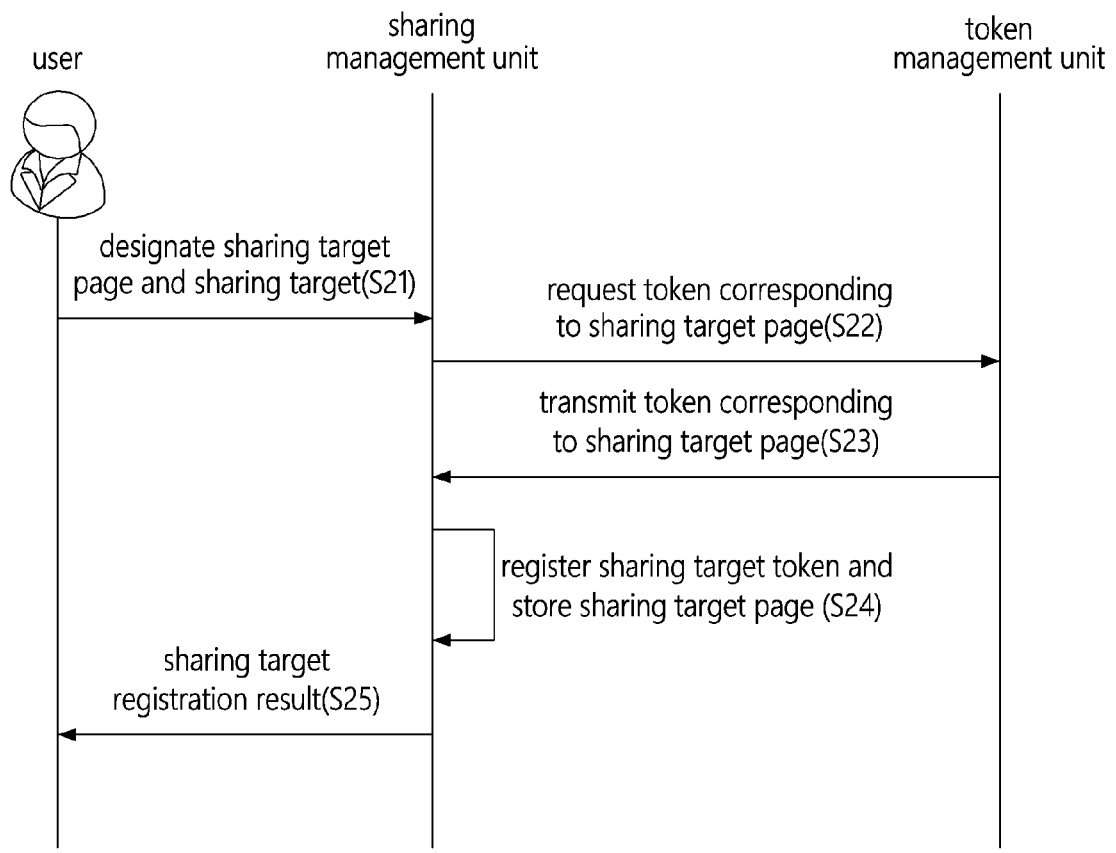

FIGS. 10 and 11 are signal flow diagrams for describing a method for sharing a document by each page according to an embodiment of the present disclosure operating in the document sharing system 100 described with reference to FIG. 1.

FIG. 10 is a signal flow diagram illustrating an automatic keyword lock processing method according to a document sharing request according to an embodiment of the present disclosure.

Referring to FIG. 10, a document sharing request is transmitted to a document management unit by a user (S11). The document management unit may receive a user's document sharing request (S11) and provide a page list to the user (S12). In this case, each page may be displayed together with the page list. Here, the user may be a document sharing requester.

The user may refer to the provided page list, select a page to request sharing, and then transmit a page sharing request to the document management unit (S13). The document management unit may transmit a keyword check request for the sharing request page to the keyword management unit (S14). The keyword management unit may perform keyword check on the sharing request page and transmit the keyword check result to the document management unit (S16). At this time, the document management unit may provide the keyword check result to the user (not shown).

After performing the keyword check, the keyword management unit may request the token management unit to generate a token for the corresponding keyword (S17). After receiving the token generation request, the token management unit may generate a token for a keyword (S18). At this time, the token management unit may store the generated token in the token management unit.

After the token is generated, the token management unit may request keyword locking process using the generated token to the document management unit (S19), and the document management unit may perform keyword locking process for a sharing request page, from which keywords are extracted, according to a lock processing method based on keyword attributes.

FIG. 11 is a signal flow diagram illustrating a method of registering a sharing target token for a sharing target according to an embodiment of the present disclosure.

First, the document sharing requester may refer to the keyword check result and the list of locked sharing request pages to determine the sharing target page, and then transmit a sharing target page and a request for designating a sharing target to the sharing management unit (S21).

The sharing management unit may request a token corresponding to the keyword included in the sharing target page from the token management unit (S22). The token management unit may generate a token corresponding to the sharing target page and transmit it to the sharing management unit (S23). In this case, the token to be transmitted may be a token generated in advance according to a keyword check result and stored in the token management unit.

The sharing management unit that has received the token may register the sharing target token for the sharing target page with respect to the sharing target. According to an embodiment, the sharing management unit may store the corresponding sharing target page, in which the sharing target token is registered, in the sharing management unit (S24).

After registering the sharing target token and storing the sharing target page, the sharing management unit may transmit the sharing target token registration result to the document sharing requester (S25).

Thereafter, the sharing target page stored in the sharing management unit may be viewed by the sharing target according to the above-described process.

According to the above-described embodiments, using a secure authentication token managed by the token management unit 140 of the document sharing system 100, documents may be shared without additional document creation, thereby providing an effect of simplifying work processes.

Figure 12:
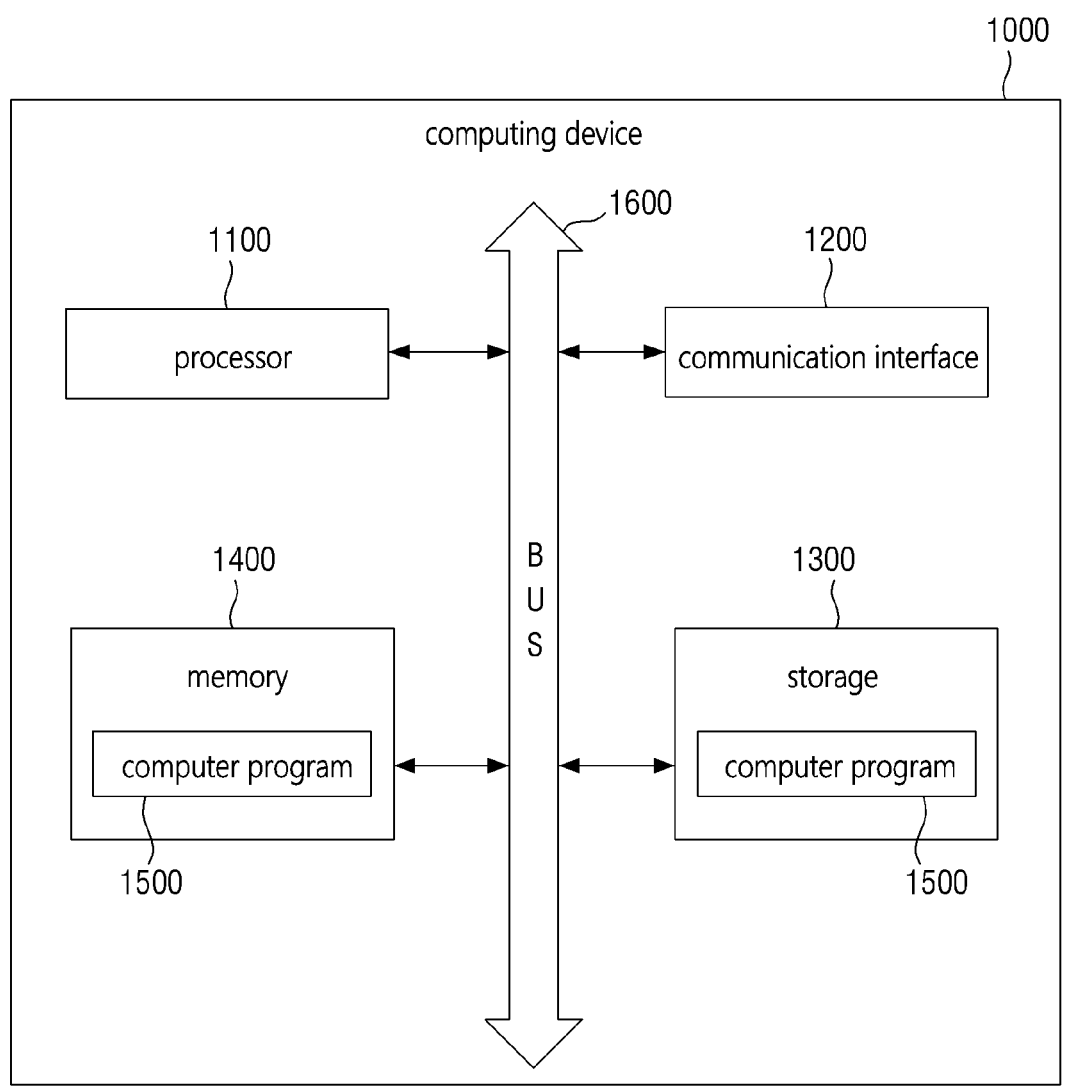
FIG. 12 is a block diagram illustrating an exemplary hardware configuration of a computing device, in which various embodiments of the present disclosure may be implemented.

FIG. 12 is a hardware configuration diagram of an exemplary computing device capable of implementing document sharing system 100 according to some embodiments of the present disclosure. As shown in FIG. 12, the computing device 1000 may comprise one or more processors 1100, a system bus 1600, a communication interface 1200, a memory for loading a computer program 1500 executed by the processor 1100, and a storage 1300 for storing the computer program 1500.

The processor 1100 controls the overall operation of each component of the computing device 1000. The processor 1100 may perform an operation for at least one application or program for executing a method/operation according to various embodiments of the present disclosure.

The memory 1400 stores various data, commands and/or information. The memory 1400 may load one or more computer programs 1500 from storage 1300 to execute methods/operations according to various embodiments of the present disclosure.

The storage 1300 may non-temporarily store one or more computer programs 1500.

The computer program 1500 may include one or more instructions, in which methods/operations according to various embodiments of the present disclosure may be implemented. When the computer program 1500 is loaded into the memory 1400, the processor 1100 may execute the one or more instructions to perform methods/operations according to various embodiments of the present disclosure.

The computer program 1500 includes, for example, instructions for receiving a sharing request for a sharing request page of a document and automatically performing a keyword check for the sharing request page, an instruction for generating a token for a keyword extracted from the sharing request page as a result of the keyword check and performing a locking process for the sharing request page using the token, and an instruction for determining a sharing target page among the sharing request pages and designating a sharing target to share the sharing target page. In this case, the document sharing system 100 according to an embodiment of the present disclosure may be implemented through the computing device 1000.

So far, a variety of embodiments of the present disclosure and the effects according to embodiments thereof have been mentioned with reference to FIGS. 1 to 12. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method performed by at least one processor for sharing a page in a document using a document sharing system, the method comprising:
  receiving, from a user of the document sharing system via a user interface of the document sharing system, a request for sharing a page of a document and automatically performing a keyword check for the requested page, wherein the keyword check corresponds to a checking of a keyword that is any one of one or more words registered with the document sharing system before the keyword check is automatically performed;
  providing, to the user via the user interface of the document sharing system, a result of the keyword check for the requested page;
  generating a token for the keyword extracted from the requested page as the result of the keyword check, and performing a locking process for the requested page using the token; and
  determining a target page among at least one requested page for sharing, and designating a sharing target with which the target page is to be shared;
  determining a lock processing method according to an attribute of the keyword; and
  identifying, to the user via the user interface of the document sharing system, an importance of the target page or the sharing target based on the determined lock processing method,
  wherein the token corresponds to the extracted keyword,
  wherein the token is an authentication token for granting access permission to or for the locking process for the requested page, and
  wherein the authentication token is based on an open standard protocol for authentication.

2. The method of claim 1, further comprising, prior to receiving the request for sharing the page of the document and automatically performing the keyword check on the requested page:
  receiving a request for sharing the document; and
  providing a page list of the document.

3. The method of claim 1, wherein the automatically performing the keyword check for the requested page comprises:
  determining whether a number of keywords included in the requested page is equal to or greater than a reference value; and
  adding, based on the number of keywords included in the requested page being equal to or greater than the reference value, a warning indication to the requested page containing the keywords of which number is equal to or greater than the reference value.

4. The method of claim 1, wherein the lock processing method comprises a method of hiding the requested page based on a first keyword being included in the requested page.

5. The method of claim 1, wherein the lock processing method comprises a method of indicating an entire requested page as locked based on a second keyword being included in the requested page.

6. The method of claim 1, wherein the lock processing method comprises a method of indicating only a region of the requested page, in which a third keyword is included, as locked, based on the third keyword being included in the requested page.

7. The method of claim 1, wherein the performing the locking process comprises:
    indicating only a region of the requested page, in which a third keyword is included, as locked, based on the third keyword being included in the requested page.

8. The method of claim 1, wherein the performing the locking process comprises:
    indicating an entire requested page as locked.

9. The method of claim 1, wherein the performing the locking process comprises:
    hiding the requested page.

10. The method of claim 1, wherein the determining the target page and the designating the sharing target comprises:
    receiving a request for sharing the target page, wherein the target page is determined by the user;
    mapping a first token, which is generated with respect to a keyword included in the target page, to the sharing target and registering the first token as a sharing target token for the sharing target; and
    transmitting data for viewing the target page to a terminal of the sharing target with reference to the sharing target token.

11. The method of claim 10, wherein the transmitting the data for viewing the target page comprises:
    receiving, from the sharing target, a request for the target page;
    determining whether the target page is locked;
    determining, based on the target page being locked, whether a sharing target token corresponding to the locked target page is registered for the sharing target; and
    unlocking, based on the sharing target token being registered, a keyword-locked target page by using the registered sharing target token and allowing viewing of the target page by the sharing target.

12. A document sharing system, including a document management server, a sharing management server, a keyword management server, and a token management server, for sharing a page in a document, the document sharing system comprising:
    at least one processor; and
    at least one memory configured to store computer program executable by the at least one processor,
    wherein the computer program comprises:
        an instruction configured to cause the at least one processor to receive, from a user via a user interface of the document sharing system, by the document management server, a request for sharing a page of a document and automatically performing, by the keyword management server, a keyword check for the requested page, wherein the keyword check corresponds to a checking of a keyword that is any one of one or more words registered with the document sharing system before the keyword check is automatically performed;
        an instruction configured to cause the at least one processor to provide, to the user via the user interface of the document sharing system, a result of the keyword check for the requested page;
        an instruction configured to cause the at least one processor to generate, by the token management server, a token for the keyword extracted from the requested page as the result of the keyword check, and performing, by the document management server, a locking process for the requested page using the token;
        an instruction configured to cause the at least one processor to a share, by the sharing management server, a target page among at least one requested page for sharing, and designating, by the sharing management server, a sharing target with which the target page is to be shared; and
        an instruction configured to cause the at least one processor to:
            determine a lock processing method according to an attribute of the keyword, and
            identify, to the user via the user interface of the document sharing system, an importance of the target page or the sharing target based on the determined lock processing method,
    wherein the token corresponds to the extracted keyword,
    wherein the token is an authentication token for granting access permission to or for the locking process for the requested page, and
    wherein the authentication token is based on an open standard protocol for authentication.

13. The document sharing system of claim 12, wherein the computer program further comprises:
    an instruction configured to cause the at least one processor to receive a request for sharing the document; and
    an instruction configured to cause the at least one processor to provide a page list of the document.

14. A non-transitory computer-readable recording medium storing computer program, the computer program being executable by at least one processor of a document sharing system, including a document management server, a sharing management server, a keyword management server, and a token management server, to cause the at least one processor to perform:
    receiving, from a user via a user interface of the document sharing system, by the document management server, a request for sharing a page of a document and automatically performing, by the keyword management server, a keyword check for the requested page, wherein the keyword check corresponds to a checking of a keyword that is any one of one or more words registered with the document sharing system before the keyword check is automatically performed;
    providing, to the user via the user interface of the document sharing system, a result of the keyword check for the requested page;
    generating, by the token management server, a token for the keyword extracted from the requested page as the result of the keyword check, and performing, by the document management server, a locking process for the requested page using the token;
    determining, by the sharing management server, a target page among at least one requested page for sharing, and designating, by the sharing management server, a sharing target with which the target page is to be shared;
determining a lock processing method according to an attribute of the keyword; and
identifying, to the user via the user interface of the document sharing system, an importance of the target page or the sharing target based on the determined lock processing method,
wherein the token corresponds to the extracted keyword,
wherein the token is an authentication token for granting access permission to or for the locking process for the requested page, and
wherein the authentication token is based on an open standard protocol for authentication.

* * * * *